W. E. WILLIAMS.
DISK WHEEL CONSTRUCTION.
APPLICATION FILED JUNE 16, 1921.
1,402,031. Patented Jan. 3, 1922.
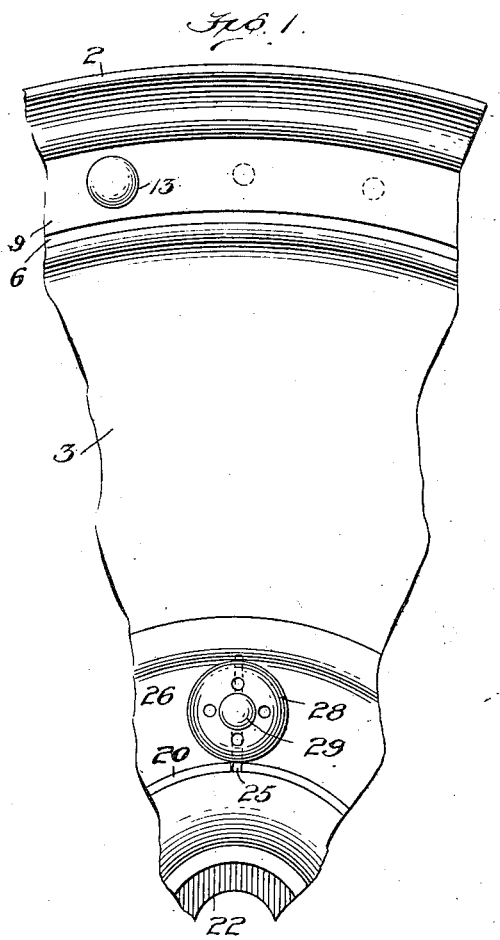
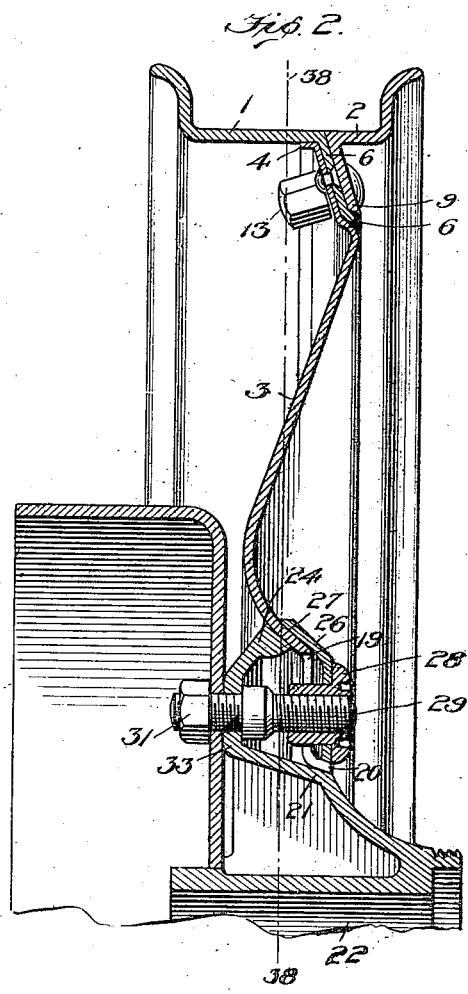
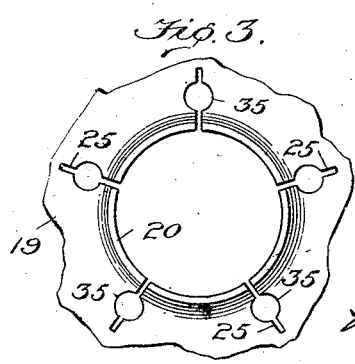
Witness
Edwin L. Bradford
Inventor
William E. Williams
By
[Attorneys signature]
Attorneys

UNITED STATES PATENT OFFICE.

WILLIAM ERASTUS WILLIAMS, OF CHICAGO, ILLINOIS.

DISK-WHEEL CONSTRUCTION.

1,402,031.  Specification of Letters Patent.  Patented Jan. 3, 1922.

Original application filed July 26, 1920, Serial No. 398,927. Divided and this application filed June 16, 1921. Serial No. 478,028.

*To all whom it may concern:*

Be it known that I, WILLIAM E. WILLIAMS, a citizen of the United States, and resident of Chicago, in the county of Cook and State of Illinois, have invented certain new and useful Improvements in Disk-Wheel Constructions, of which the following is a specification, reference being had therein to the accompanying drawings.

An object of this invention is to provide a disk wheel which combines elasticity with strength by curving the disk back and forth across the main load plane of the wheel and detachably securing it to the hub by devices through the use of which it is readily detached when rusted or distorted and under any and all practical conditions, and which has various other advantages.

In the accompanying drawings,

Fig. 1 is a face view of a small sector of the wheel.

Fig. 2 is a radial section of the same wheel.

Fig. 3 is a side view of the central portion of the disk.

In these figures, which show construction set forth in my application Serial Number 398,927, of which this application is a division, 1 and 2 designate rim parts which have oblique inwardly extending flanges 6, 9, connected, outside the central load plane, by bolts at 13, and to the flange 6 is secured the outer portion of a disk 3, progressively decreased in thickness in passing from the center and having a marginal flange 4 resting against the rim part 1. This disk is dished inwardly to carry it to the inner side of said plane and is recurved to bring it again to the outer side where it forms a central zone 19, parallel to the plane of the wheel and having an oblique annular terminal flange 20.

22 represents the central portion of a hub having a flange 33, 24 provided, approximately in said load plane, with an oblique annular bearing face, relatively distant from the hub axis, against which the recurved disk bears. At a materially less distance from that axis and outside said load plane, the hub has a second inclined bearing surface 21 against which fits the disk flange 20. The disk zone 19 has bolt and nut receiving holes 35 and radial slots 25, and when the nuts are removed the relatively small stud bolts 29 lie in the larger apertures and with the slots allowing some yielding, there is nothing to prevent easy removal of the disk which was before clamped to the hub by the nut 28 while the stud bolt was rigidly fixed to the hub by the nut 31, the clamping by the nut 28, however, not being direct but by means of a perforated ring 26 the marginal portions of which fit respectively, against the inclined part 27, of the disk, which rests against the oblique face 24, and against the inclined, hub-fitting disk flange 20. Besides aiding in detaching the disk, the slots in the zone 19 insure the fitting of the disk without material clamping strain, regardless of perfection in shape or fitting of the parts.

It is to be noted that the outer surface or lateral face of the wheel is nearly smooth and so readily kept clean, and that detaching the disk involves no separation of sleeve-like parts but merely lifting it from its inclined seats.

What I claim is:

1. In a wheel of the class described, the combination with a suitable flanged hub, of a rim, and a wheel disk, marginally secured to the rim outside the central load plane, dished inwardly beyond that plane, recurved to meet a hub flange near that plane, carried farther outward to form a central zone outside that plane and marginally fitting the hub.

2. In a device of the class described, the combination with a hub having a flange approximately in the central load plane, of a rim, a wheel disk secured to the rim outside that plane, dished inwardly to pass to the inner side of that plane, recurved to meet an inclined face of said flange, and extending outwardly to meet an outer bearing on the hub, and means for detachably securing the disk to the hub.

3. The combination with a hub having a flange approximately in the central load plane of the wheel, of a rim, a wheel disk secured to the rim outside that plane, dished inwardly to pass beyond said plane and return to meet an inclined face of said flange and pass outward therefrom to an outer hub bearing, and means for holding said disk against both its bearings on the hub.

4. The combination with a wheel rim, of a hub having, approximately in the central load plane an inclined annular bearing face relatively distant from the hub axis and second inclined bearing face nearer that axis and outside said plane, of a wheel disk secured to the rim outside said plane, dished inwardly to carry it beyond that plane and return it along the face of the bearing first mentioned to meet the second bearing face, and a clamp simultaneously binding the disk against both bearing faces.

5. The combination with a wheel rim, of a hub having, approximately in the central load plane an inclined bearing face relatively distant from the hub axis and a second similarly inclined bearing face nearer that axis and outside said load plane, of a wheel disk secured to the rim outside said plane, dished inwardly to carry it beyond that plane and return it to the bearing first mentioned whence it passes toward the hub and then to the second bearing, the zone between the two bearings being perforated, and bolts passing through the perforations, respectively, and binding the disk to the hub.

6. The combination with a wheel rim, of a hub having, approximately in the central load plane an inclined bearing face relatively distant from the hub axis and a second similarly inclined bearing face nearer that axis and outside the load plane, of a wheel disk secured to the rim outside said plane, dished inwardly to carry it beyond that plane and return it along the bearing face first mentioned to the second bearing face, a disk-clamping ring having inclined faces fitting the disk and in registry with the two inclined bearing faces, and means for forcing the ring toward said faces to clamp the disk between two pairs of oblique annular surfaces.

In testimony whereof I hereunto affix my signature.

WILLIAM ERASTUS WILLIAMS.

Witnesses:
   F. ZOBEL,
   B. J. BERNHARD.